(12) United States Patent
Xie et al.

(10) Patent No.: US 10,886,540 B2
(45) Date of Patent: Jan. 5, 2021

(54) SYSTEMS AND METHODS OF GRAPHENE SUPPORTED CATALYSTS

(71) Applicant: Indiana University Research and Technology Corporation, Indianapolis, IN (US)

(72) Inventors: Jian Xie, Carmel, IN (US); Zhe-Fei Li, The Plains, OH (US); Le Xin, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 521 days.

(21) Appl. No.: 15/377,976

(22) Filed: Dec. 13, 2016

(65) Prior Publication Data

US 2017/0170487 A1    Jun. 15, 2017

Related U.S. Application Data

(60) Provisional application No. 62/267,156, filed on Dec. 14, 2015.

(51) Int. Cl.
*H01M 4/92* (2006.01)
*H01M 8/1018* (2016.01)

(52) U.S. Cl.
CPC .... *H01M 4/926* (2013.01); *H01M 2008/1095* (2013.01)

(58) Field of Classification Search
CPC ..... H01M 4/9075; H01M 4/925; H01M 4/926
See application file for complete search history.

(56) References Cited

U.S. PATENT DOCUMENTS

| | | | | |
|---|---|---|---|---|
| 2010/0222206 A1* | 9/2010 | Konishi | ................... | H01M 4/92 502/101 |
| 2011/0017587 A1* | 1/2011 | Zhamu | ................... | B82Y 30/00 204/157.62 |
| 2012/0208088 A1* | 8/2012 | Xie | ......................... | B01D 53/02 429/231.8 |
| 2012/0245018 A1* | 9/2012 | Kurungot | ............... | B82Y 30/00 502/2 |
| 2013/0236816 A1* | 9/2013 | Jung | ....................... | H01M 4/96 429/532 |

(Continued)

OTHER PUBLICATIONS

Tsuyohiko Fujigaya and Naotoshi Nakashima; "Fuel Cell Electrocatalyst Using Polybenzimidazole-Modified Carbon Nanotubes as Support Materials", 2013, Advanced Materials, 25, 1666-1681 (Year: 2013).*

*Primary Examiner* — Barbara L Gilliam
*Assistant Examiner* — Nathanael T Zemu
(74) *Attorney, Agent, or Firm* — Faegre Drinker Biddle & Reath LLP

(57) ABSTRACT

Functionalized graphene comprising graphene, a metal dispersed throughout the graphene, wherein the metal comprises Pt, Rh, Pd, Ag, Au, Ni, Os, Ir, alloys thereof, oxides thereof, or mixtures thereof, and a first functional group covalently bonded to the graphene, wherein the first functional group comprises sulfonate, $SO_3^-$, Carboxylate, $COO^-$, a tertiary amine, $NR_3^+$, where R is H, alkyl, aryl, or combinations thereof, polybenzimidazole (PBI), poly(ethylene oxide) (PEO), polyphenylene oxide (PPO), polyaniline, or mixtures thereof are disclosed. Methods of manufacture are also disclosed.

4 Claims, 18 Drawing Sheets

(56) References Cited

U.S. PATENT DOCUMENTS

2015/0255801 A1* 9/2015 Sundara .............. H01M 8/1018
              429/524
2016/0293972 A1* 10/2016 Tour .......................... C01B 5/00
2017/0279143 A1* 9/2017 Tsukuda ................... B01J 37/08
2018/0006313 A1* 1/2018 Haas ........................ B01J 21/18

* cited by examiner

SYSTEMS AND METHODS OF GRAPHENE SUPPORTED CATALYSTS

CROSS-REFERENCE TO RELATED APPLICATIONS

This application claims priority to U.S. Provisional Application Ser. No. 62/267,156, filed on Dec. 14, 2015, the entire disclosure of which is hereby expressly incorporated by reference.

FIELD OF THE DISCLOSURE

This disclosure relates to functionalized graphene structures with metallic particles covalently bonded thereto. More specifically, this disclosure relates to functionalized graphene structures with hydrophilic and hydrophobic properties where metallic particles are anchored to the functionalized graphene structure.

BACKGROUND

Catalysts may be understood to be a substance that causes or alters the rate of a chemical reaction and may be recovered, essentially unaltered in form and amount at the end of a reaction. However, in many diverse fields, such as fuel cells and batteries, catalysts may be bonded chemically or physically to a substrate, which may or may not aid the catalyst in performing the desired reaction with sufficient durability.

However, in some instances catalysts may participate in multiple chemical transformations. The participation of the catalyst in multiple chemical transformations may lead to some undesired effects, such as causing the catalyst to separate from the substrate and/or may cause the catalyst to agglomerate. The agglomeration or particle surface migration of catalysts on a substrate can decrease the efficacy of the catalysts. This can occur because the efficacy of catalysts is dependent on the surface area of the catalyst available for various chemical transformations and the agglomeration or surface migration of the catalyst can reduce the surface area of the catalyst available for participation in a desired reaction.

The decreased efficiency of catalysts through surface migration or agglomeration, for example in fuel cells, may increase the costs of the fuel cell and can also reduce the life expectancy of the fuel cell, which in some situations may be mission limiting.

Also, while limiting surface migration or agglomeration is desired, similarly control of catalyst distribution and size is also desirable. For example, controlling catalyst particle size during production and more evenly distributing the catalysts across a substrate (e.g., having a substantially homogenous distribution), may allow for improved catalytic performance and improved life-cycle prediction, for example, when manufacturing is upscaled.

Furthermore, products and/or by-products of the multiple chemical transformations of various chemical reactions may reduce the available catalytic sites—similar to competitive inhibition—when the products and/or by-products remain on the surface of the catalyst.

For example, in fuel cells, $H_2O$ is often a product of the chemical reaction that takes place in the fuel cell. However, the buildup of $H_2O$ in the fuel cell (e.g., flooding) can decrease the efficiency of the fuel cell, preventing the reactants from reaching the catalyst and, in some instances, may even stop the reaction.

Flooding is also problematic because the presence of excessive amounts of water on various substrates—such as carbon—may cause corrosion. For example, in fuel cells, corrosion of the electrodes may occur if flooding is not prevented or limited when carbon substrates, such as graphene are used. The corrosion may also limit the life or durability of fuel cells and may be mission limiting, for example in space exploration.

Furthermore, substrates with improved kinetic, ohmic, and mass transport are needed to help improve performance of the catalyst. However, with surface migration, agglomeration, and corrosion, conventional substrates are substantially limited and, in some cases, limit the ability to use conventional fuel cells, for example, in future space exploration missions.

Accordingly, a need therefore exists to cost effectively address issues of particle surface migration, flooding, and corrosion for catalytic surfaces, such as electrodes in a fuel cell.

SUMMARY

Various embodiments of functionalized graphene or catalysts are disclosed herein. The functionalized graphene may be used in a fuel cell or membrane electrode assembly (MEA). For example, in some embodiments, the fuel cell or MEA may comprise a cathode including the functionalized graphene.

In various embodiments, the functionalized graphene may include graphene, a metal dispersed throughout the graphene, wherein the metal comprises at least one of Pt, Rh, Pd, Ag, Au, Ni, Os, Ir, Mn, Co, alloys thereof, oxides thereof, or mixtures thereof, and a first functional group covalently bonded to the graphene, wherein the first functional group comprises at least one of sulfonate, $SO_3^-$, Carboxylate, $COO^-$, an amine, $NR_3^+$, where R is H, alkyl, aryl, or combinations thereof, polybenzimidazole (PBI), poly(ethylene oxide) (PEO), polyphenylene oxide (PPO), polyaniline, or mixtures thereof.

Various methods of manufacture disclosed herein may include functionalizing graphene with a first functional group, wherein the first functional group comprises at least one of sulfonate, $SO_3H$, Carboxylate, COOH, a tertiary amine, $NR_3^+$, where R is H, alkyl, aryl, or combinations thereof, polybenzimidazole (PBI), poly(ethylene oxide) (PEO), polyphenylene oxide (PPO), polyaniline, or mixtures thereof, and loading a metal on to the graphene, wherein the metal comprises at least one of Pt, Rh, Pd, Ag, Au, Ni, Os, Ir, Mn, Co, alloys thereof, oxides thereof, or mixtures thereof.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1A:
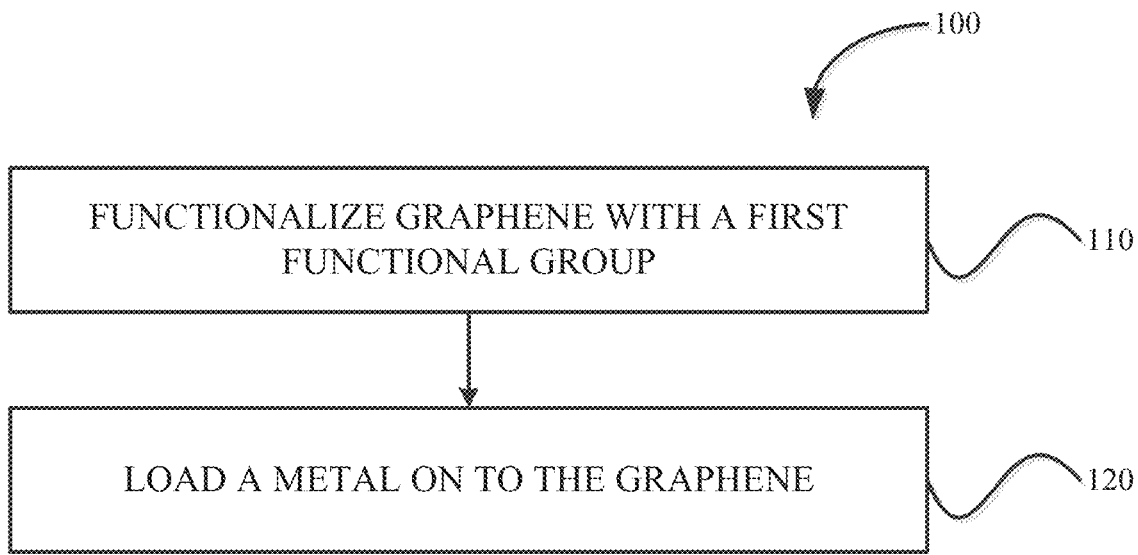
FIG. 1A illustrates a method of manufacture according to various embodiments.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The embodiments disclosed below are not intended to be exhaustive or limit the disclosure to the precise forms disclosed in the following detailed description. Rather, the embodiments are chosen and described so that others skilled in the art may utilize its teachings.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

FIG. 1 illustrates method 100 according to various embodiments. Method 100 may comprise functionalizing graphene with a first functional group (step 110). The functionalizing of graphene is not particularly limited and, in various embodiments, the first functional group may comprise sulfonate, $SO_3H$, Carboxylate, COOH, a tertiary amine, $NR_3^+$, where R is H, alkyl, aryl, or combinations thereof, polybenzimidazole (PBI), poly(ethylene oxide) (PEO), polyphenylene oxide (PPO), polyaniline, or mixtures thereof. Method 100 may also comprise loading a metal on to the graphene. The loading of the metal is not particularly limited and may be appropriate for various metal catalysts. For example, in various embodiments, the metal may comprise Pt, Rh, Pd, Ag, Au, Ni, Os, Ir, Mn, Co, alloys thereof, oxides thereof, or mixtures thereof. For example, in various embodiments the metal may be Pt, a Pt alloy, a Pt oxide, or mixtures thereof.

Various embodiments of method 100 may include processes which yield a catalytic metallic nanoparticle having an average particle size distribution between about 1 nm to about 6 nm, for example as exemplified below. Without being limited to any theory, it is believed that methods which yield catalytic metallic nanoparticles distributed throughout the substrate may improve catalytic performance, prevent surface migration or agglomeration, and may yield more predictable life expectancy of the catalyst, for example, in a fuel cell.

Figure 1B:
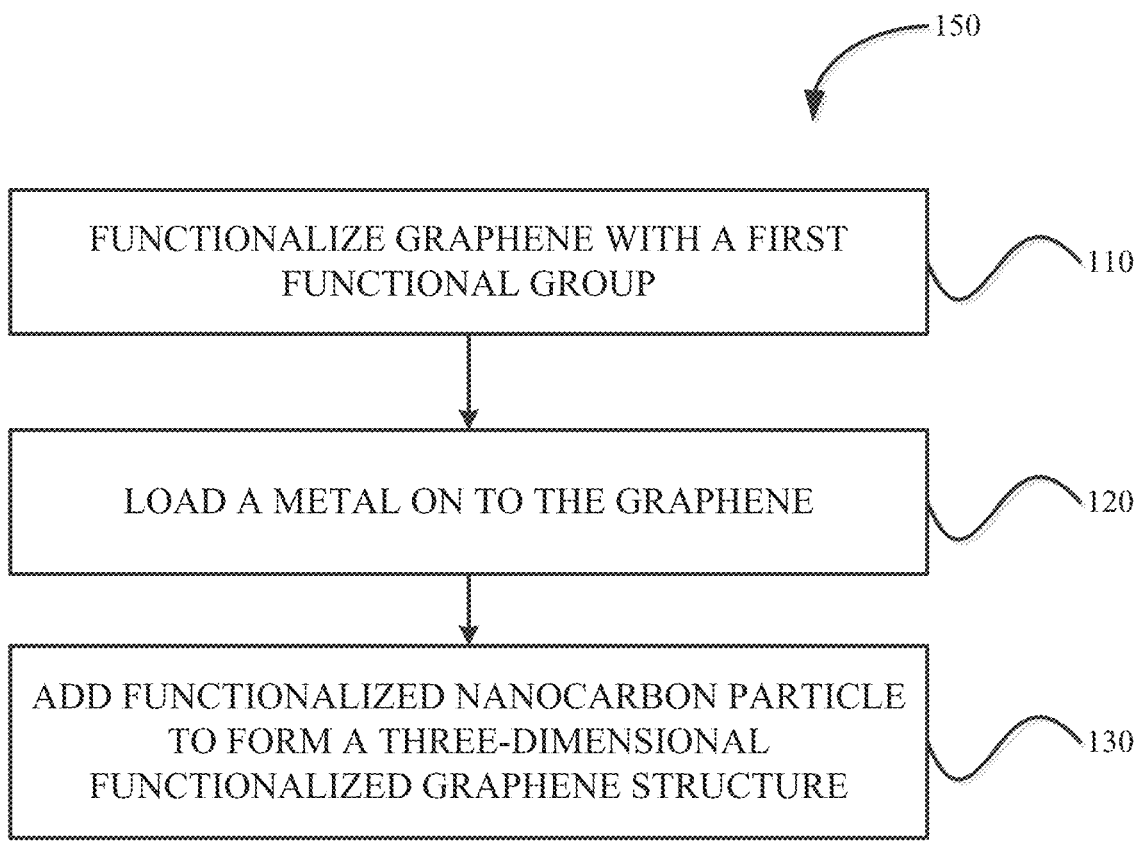
FIG. 1B illustrates a method of manufacturing a three-dimensional functionalized graphene structure according to various embodiments.

FIG. 1B illustrates method 150 according to various embodiments. Method 150 may comprise functionalizing graphene with a first functional group (step 110) and loading a metal on to the graphene (step 120). Method 150 may also comprise adding a functionalized nanocarbon particle (with opposite surface energy to functional graphene made in step 110) to form a three-dimensional functionalized graphene structure (step 130).

In various embodiments, the three-dimensional functionalized graphene structure may comprise pores, channels, or a combination thereof. Without being limited to any theory, it is believed that the pores, channels, and mixtures thereof may allow for increased catalytic surface area, while providing sufficient volumetric flow for reactants supplied for catalytic reactions or products and by-products produced by the catalytic reactions. For example, in fuel cells, it is believed that the three-dimensional structures produced by method 150 may allow for improved mass transport of reactants (i.e. $H_2$, methanol, ethanol, $O_2$, etc.), products and water drainage, which may increase the overall fuel cell performance including improving catalytic performance, increasing fuel utilization, and reducing or preventing flooding of the electrode.

Furthermore, in various embodiments, the functionalized nanocarbon particle added in step 130 may comprise high graphitic carbons, nanographites, metal oxides, ceramics, a polymer-grafted metal oxides, and functionalized versions of these particles or combinations thereof. Without being limited to any theory, it is believed that the use of functionalized nanocarbon, metal oxide, polymer grafted metal oxides, polymer grafted Si or $SiO_2$ or ceramic particles, may help to suppress spacer corrosion and, thus, keep the pores/channels open to help prevent electrochemical surface area loss and improve the mass transfer of reactants and products.

Also disclosed herein are products, such as functionalized graphene. According to various embodiments, the functionalized graphene may comprise graphene, a metal dispersed throughout the graphene, wherein the metal comprises one of Pt, Rh, Pd, Ag, Au, Ni, Os, Ir, Mn, Co alloys thereof, oxides thereof, or mixtures thereof, and a first functional group covalently bonded to the graphene, wherein the first functional group comprises one of sulfonate, $SO_3^-$, carboxylate, $COO^-$, a tertiary amine, $NR_3^+$, where R is H, alkyl, aryl, or combinations thereof, polybenzimidazole (PBI), poly (ethylene oxide) (PEO), polyphenylene oxide (PPO), polyaniline, or mixtures thereof. Without being limited to any theory, it is believed that functionalized graphene having the aforementioned characteristics may have improved properties over conventional catalyst substrates.

For example, in various embodiments, the first functionalized group may help to alter the hydrophobicity of the graphene. In various embodiments, the first functionalized graphene may be added to help make the functionalized graphene hydrophilic or hydrophobic depending on the functional groups used and help decrease the contact angle. In various embodiments, the wettability of the graphene may have a contact angle between about 45° and 180°, between about 110° and about 160°, or between about 115° and about 150°.

As described above, the metal may comprise one of Pt, Rh, Pd, Ag, Au, Ni, Os, Ir, alloys thereof, oxides thereof, or mixtures thereof. Thus, in some embodiments, the metal may comprise Pt, a Pt alloy, a Pt oxide, or mixtures thereof.

Thus, in some embodiments, the functionalized graphene may be used as a catalyst support, for example in a fuel cell. Thus, in various embodiments, the functionalized graphene may be an anode or cathode. Also, in various embodiments, the anode or cathode may comprise part of a fuel cell.

Figure 6A:
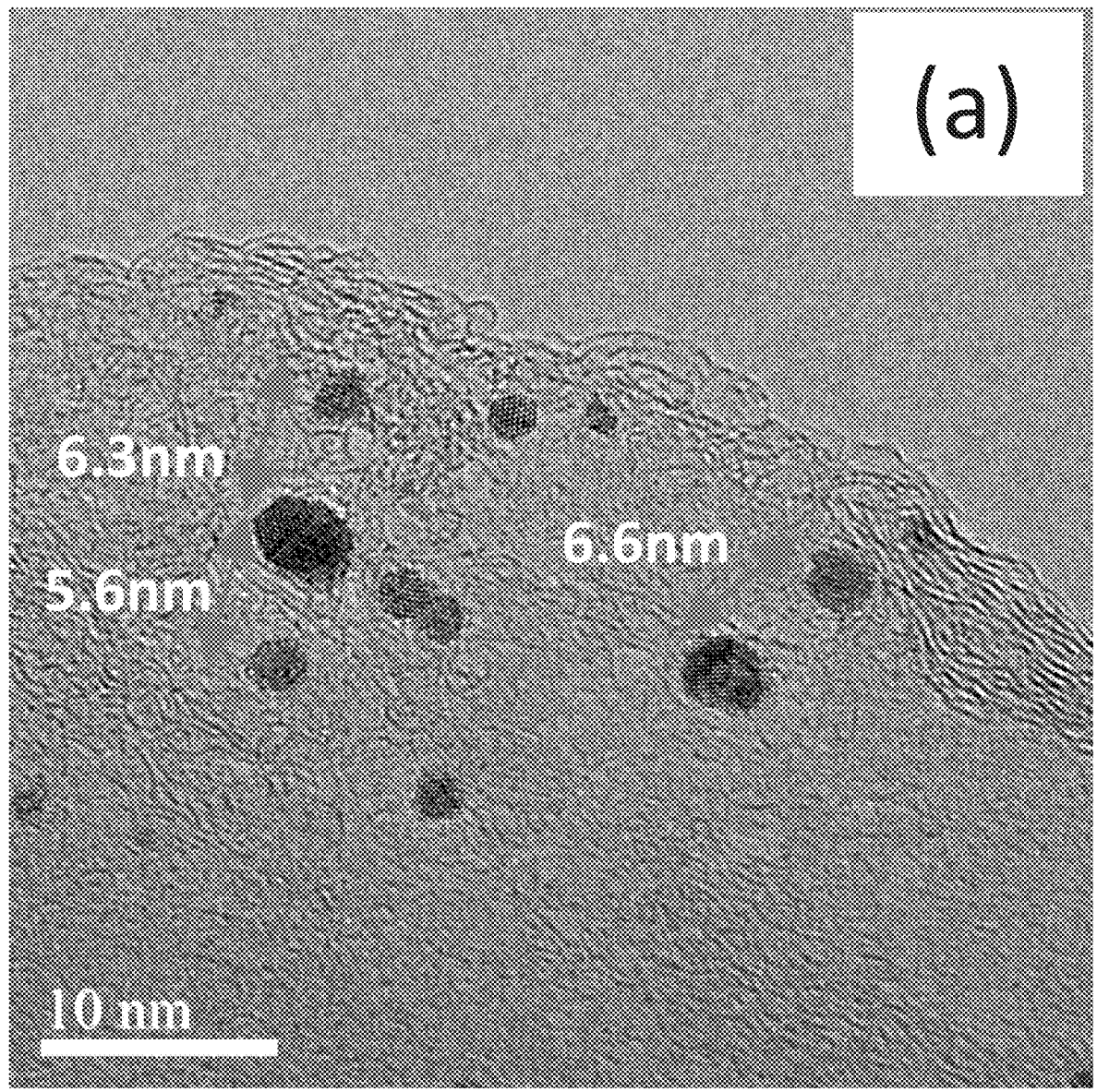
FIGS. 6A and 6B illustrate particle surface migration of the Pt nanoparticles dispersed on a conventional graphene sheet.
Figure 6B:
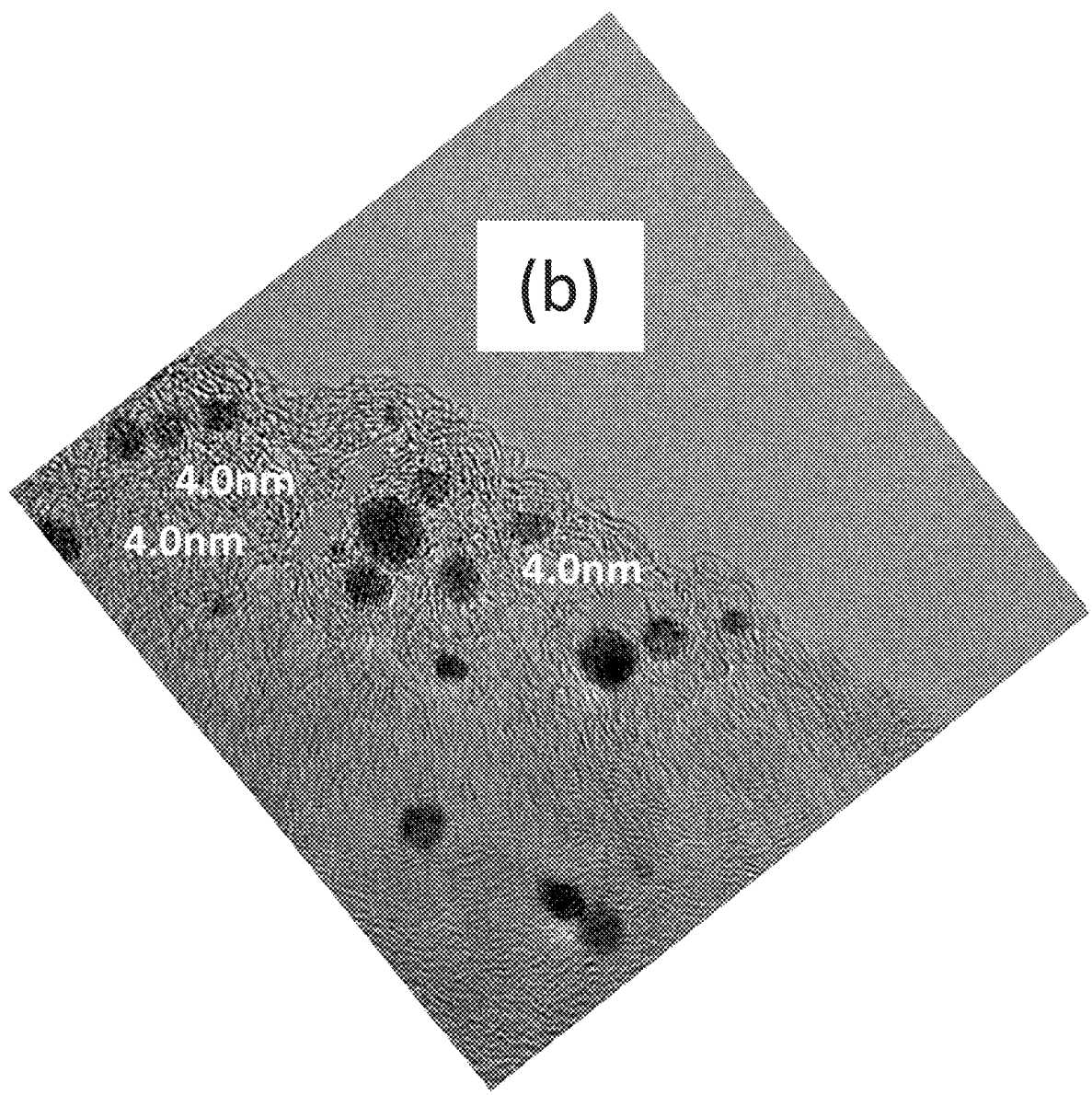
Figure 6C:
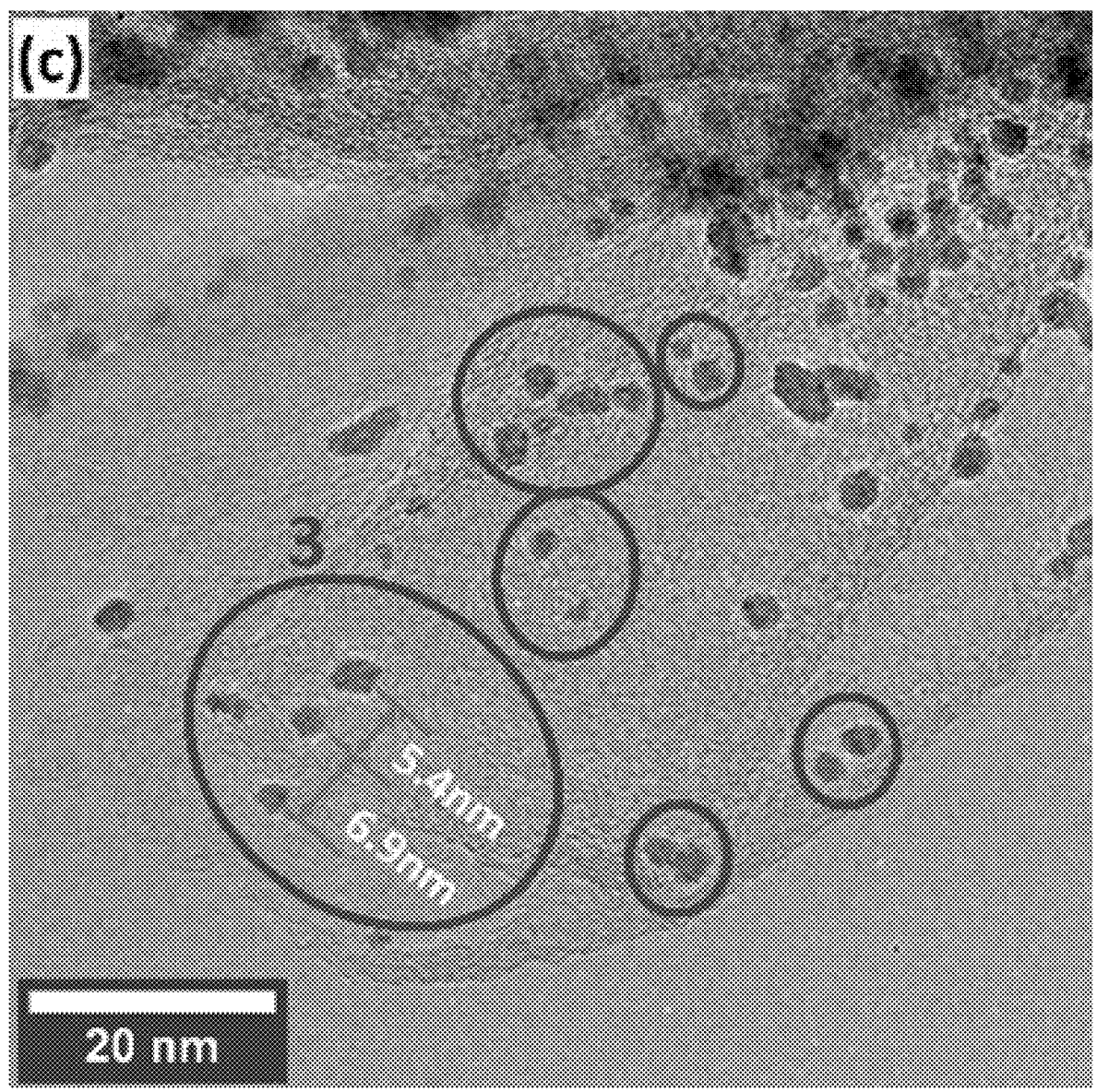
FIGS. 6C and 6D illustrate particle surface migration of the Pt nanoparticles dispersed on a functionalized graphene sheet according to various embodiments.
Figure 8:
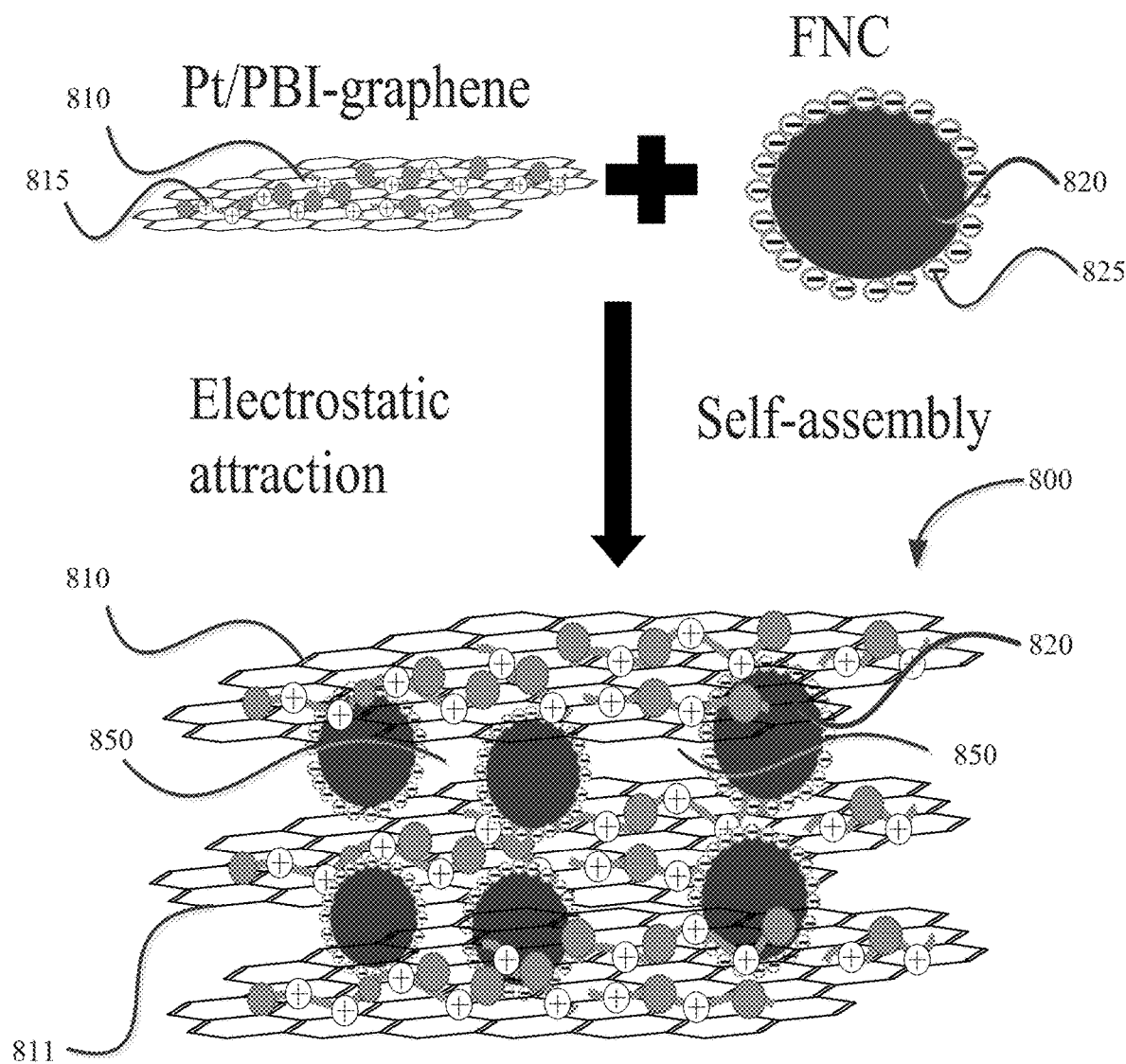
FIG. 8 illustrates the self-assembly of a three-dimensional functionalized graphene structure according to various embodiments.

Also, the first functional group may comprise one of sulfonate, $SO_3^-$, Carboxylate, $COO^-$, a tertiary amine, $NR3^+$, where R is H, alkyl, aryl, or combinations thereof, polybenzimidazole (PBI), poly(ethylene oxide) (PEO), polyphenylene oxide (PPO), polyaniline, or mixtures thereof. For example, FIG. 6C illustrates an embodiment functionalized with $SO_3^-$, while FIG. 8 illustrates an alternative embodiment where the first functional group comprises PBI.

Figure 2:
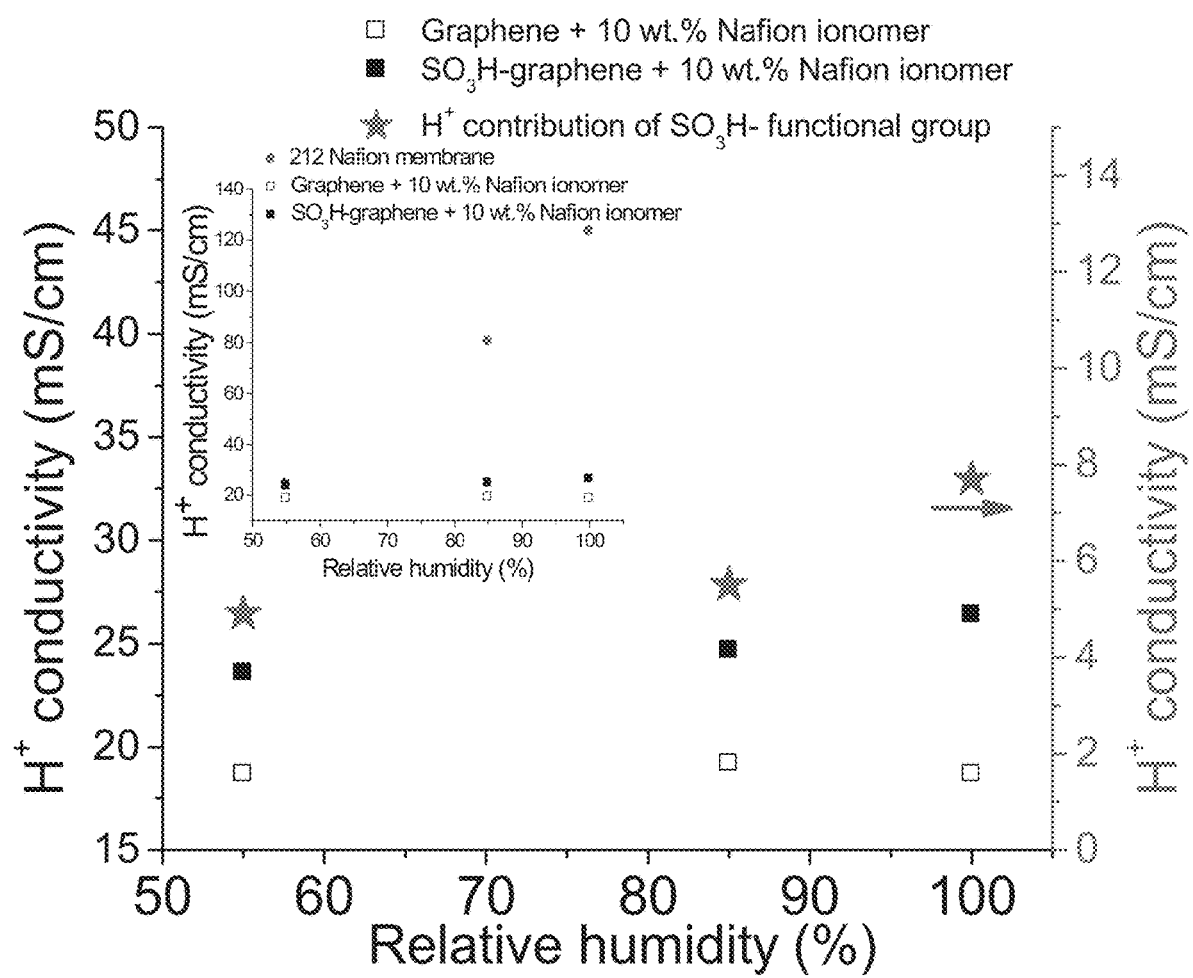
FIG. 2 illustrates the $H^+$ conductivity of conventional graphene and functionalized graphene based on varying relative humidity according to various embodiments.

For example, FIG. 2 illustrates a comparison of $H^+$ conductivity of graphene functionalized with $SO_3H$ compared to conventional graphene. As can be seen in FIG. 2, the functionalized graphene had unexpectedly improved $H^+$ conductivity at varying relative humidity.

Figure 3:
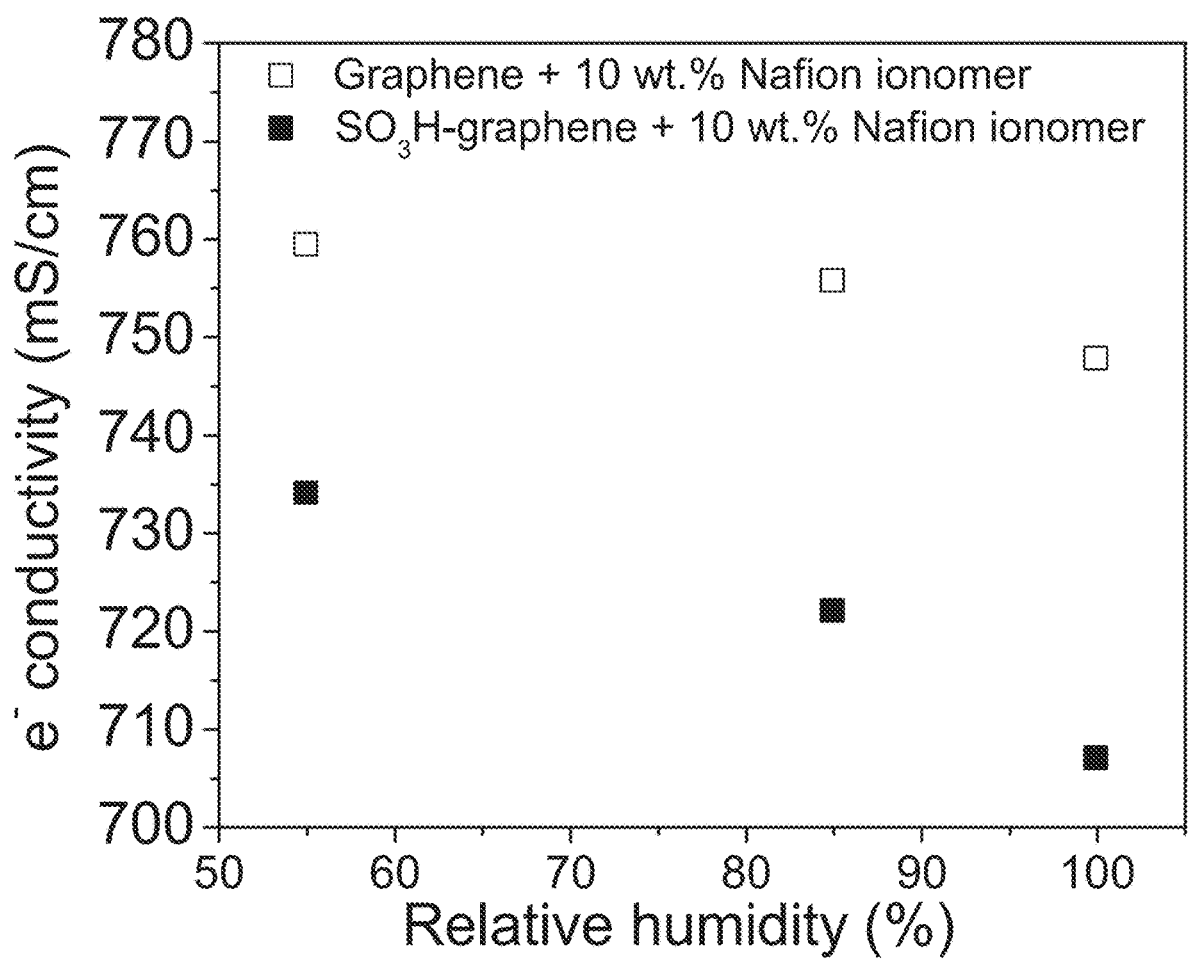
FIG. 3 illustrates the $e^-$ conductivity of conventional graphene and functionalized graphene based on varying relative humidity according to various embodiments.

Similarly, FIG. 3 illustrates a comparison of $e^-$ conductivity of graphene functionalized with $SO_3H$ compared to conventional graphene. As can be seen in FIG. 3, the functionalized graphene had unexpectedly lower $e^-$ conductivity at varying relative humidity.

Figure 4A:
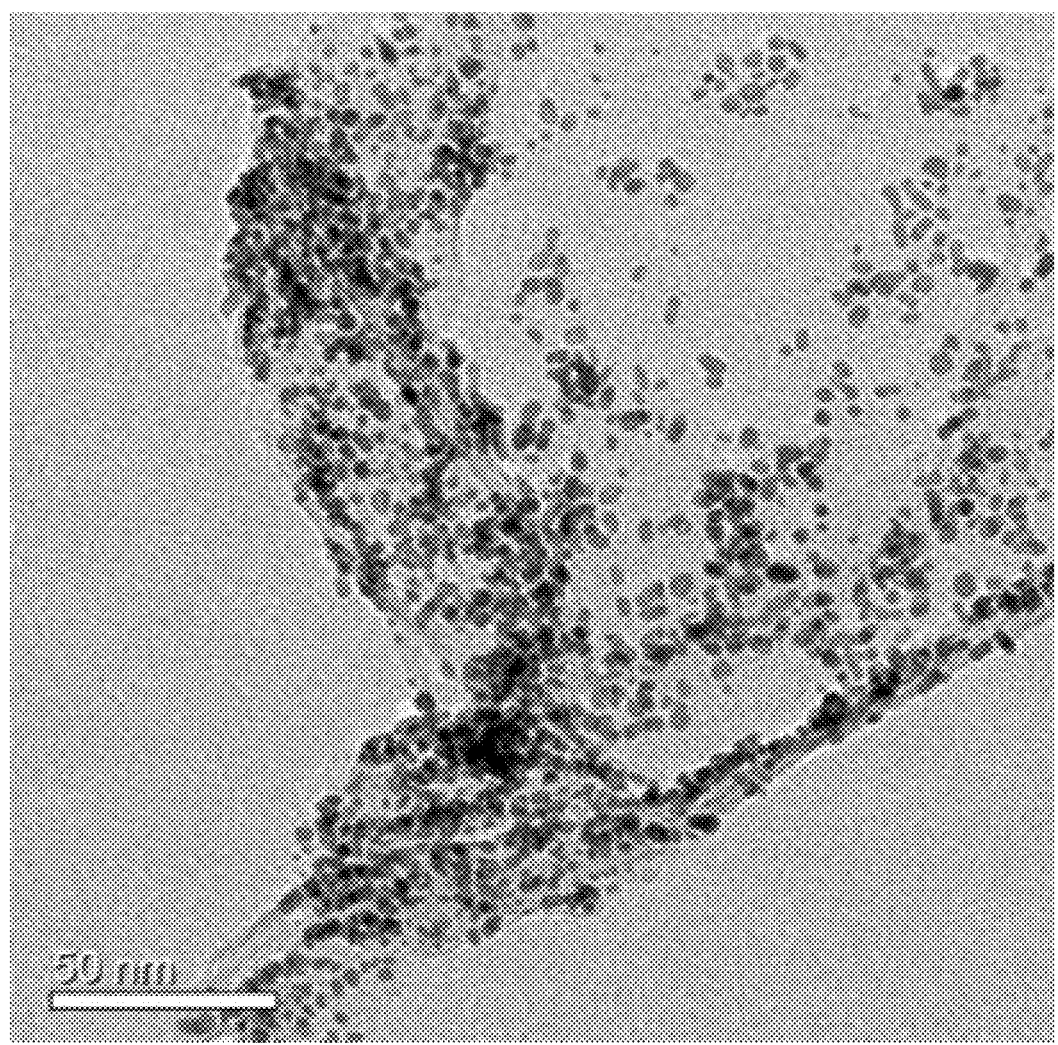
FIG. 4A is a transmission electron microscopy ("TEM") image of platinum (Pt) nanoparticles dispersed in a conventional graphene sheet.
Figure 4B:
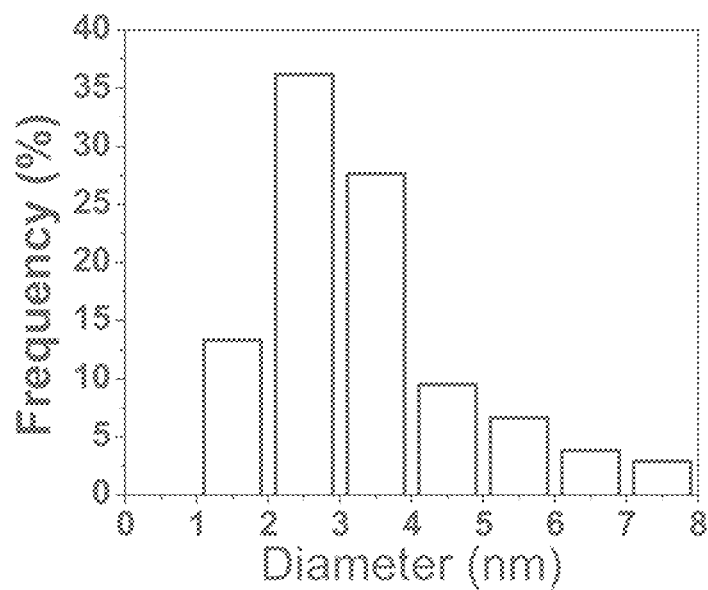
FIG. 4B is a histogram illustrating the distribution of the Pt nanoparticles dispersed in the conventional graphene sheet.

Moreover, functionalized graphene with the aforementioned properties can also exhibit better particle dispersion than conventional catalysts. For example, FIGS. 4A and 4B illustrate the particle dispersion of Pt catalysts on conventional graphene sheets. As can be seen in FIG. 4A—a transmission electron microscopy ("TEM") image of Pt dispersed in conventional graphene—Pt particle agglomeration is present. Thus, some catalytic Pt particles are larger Pt particles. This observation can be confirmed by the histogram of FIG. 4A shown in FIG. 4B, which contains a histogram of the diameter size of the Pt particles.

Figure 5A:
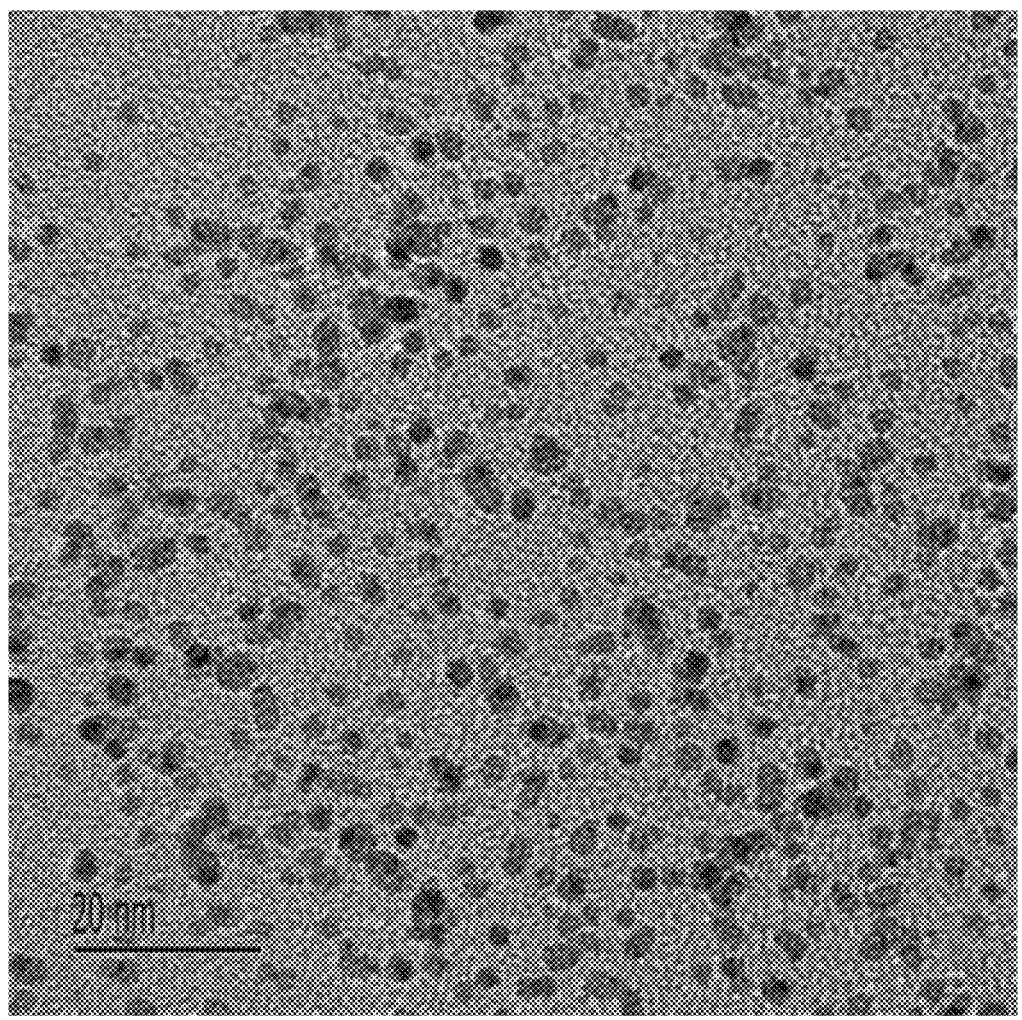
FIG. 5A is a TEM image of Pt nanoparticles dispersed in a functionalized graphene sheet according to various embodiments.
Figure 5B:
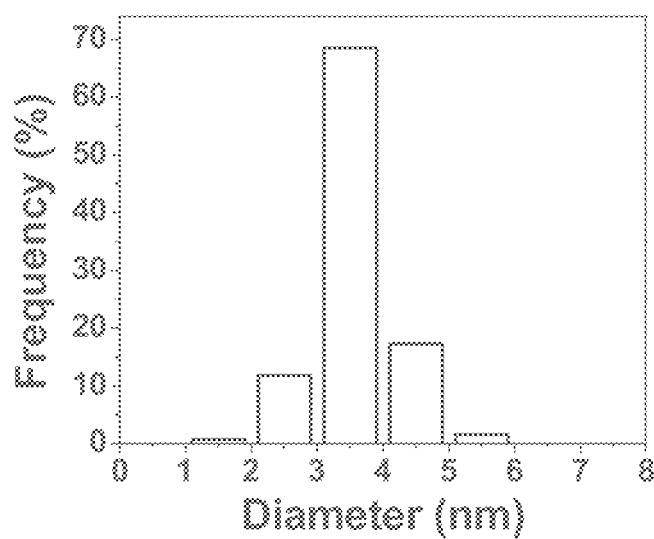
FIG. 5B is a histogram illustrating the distribution of the Pt nanoparticles dispersed in the functionalized graphene sheet according to various embodiments.

However, FIGS. 5A and 5B illustrate the particle dispersion of functionalized graphene according to various embodiments. FIG. 5A is a TEM image of Pt particles in functionalized graphene. As can be seen in FIG. 5A, the Pt particle dispersion is more uniform and consistent across the functionalized graphene sheet. Thus, in various embodiments, the metal may be substantially homogeneously dispersed throughout the functionalized graphene. As used herein, the term "substantially homogeneously dispersed" may include (1) the size distribution of catalyst particles are in a tight range, namely, the smaller the difference in particle size for each particle, the more uniform distribution, (2) the distribution of inter-particle distances between different catalyst particles fall in a more narrow range.

This uniform dispersion also reduced initial Pt agglomeration when forming the functionalized graphene sheet and, thus, the Pt particle size shows a more uniform distribution, as confirmed by FIG. 5B. Thus, in various embodiments, the average particle size distribution may be between about 1 nm to about 6 nm.

Figure 6D:
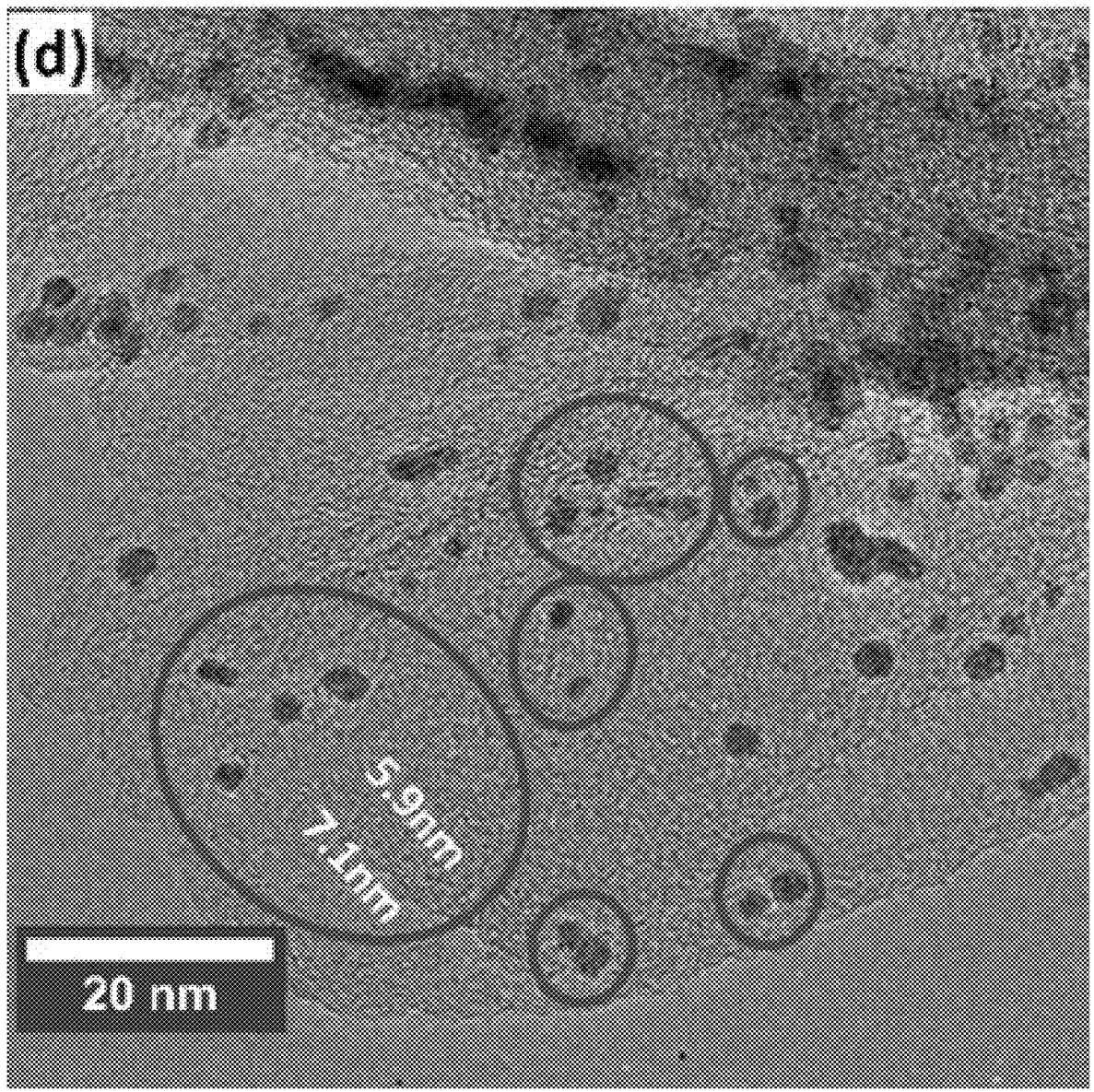

Also, it is believed that the functionalized graphene disclosed herein can reduce surface migration of various metal particles, such as metal catalysts. For example, FIGS. 6A and 6B illustrate the surface migration of Pt nanoparticles on conventional graphene, while FIGS. 6C and 6D illustrate the much reduced surface migration of Pt nanoparticles on functionalized graphene sheets according to various embodiments. As can be seen in FIGS. 6A and 6B, considerable surface migration of Pt nanoparticles was evident after cycling. However, as can be seen in FIGS. 6C and 6D, graphene sheets functionalized with $SO_3H$ had considerably less surface migration of the catalytic Pt nanoparticles.

Without being limited to any theory, it is believed that the functionalized graphene may help to anchor the metal particles to the functionalized graphene and, thus, help to reduce or eliminate surface migration or agglomeration.

Figure 7:
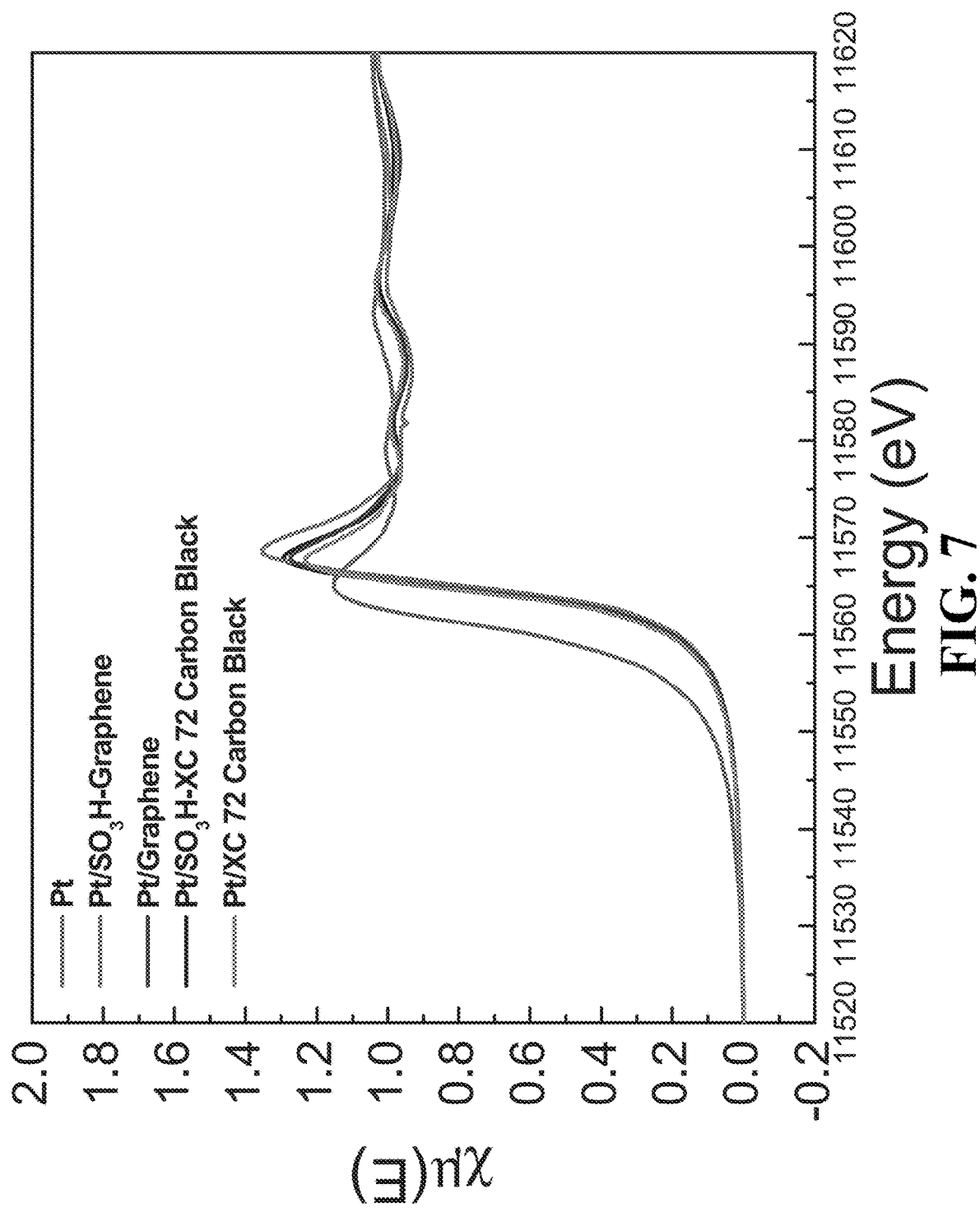
FIG. 7 illustrates a comparison of various substrates.

FIG. 7 illustrates a comparison of various substrates comprising Pt nanoparticles. The catalyst Pt nanoparticles bonded with the different carbon supports (the bonding of Pt—C) was studied using X-ray absorption spectroscopy (XAS) for the Pt L edge binding energy shift, which is illustrated in FIG. 7. The normalized X-ray absorption near edge structures (XANES) spectra for Pt L3-edge of different catalyst particles on different supports is shown in FIG. 7. The intensity of Pt L3-edge of the different catalyst particles on different supports was plotted vs the bind energy (eV). The stronger the Pt—C interaction is, the higher the intensity of the L-edge is, which gives the order of Pt—C weak bonding strength: Pt/SO3H-G>Pt/SO3H-XC72 carbon black>Pt/G>Pt/XC72 carbon black. Clearly, functionalized graphene enhanced the Pt anchoring (illustrated also by TEM in FIGS. 6C and 6D and in FIG. 7) and, consequently, it also enhances Pt nanoparticle stability, as evidenced by MEA cycling results illustrated in the table below. The Y axis in FIG. 7 is the Pt.

TABLE 1

Summary of Pt Intensity

| Sample | Intensity of Pt $L_3$-edge |
| --- | --- |
| Unsupported Pt | 1.15341 |
| Pt/SO$_3$H-graphene | 1.35368 |
| Pt/SO$_3$H-XC-72 carbon black | 1.29534 |
| Pt/graphene | 1.27472 |
| Pt/SC-72 carbon black | 1.23330 |

Also, it is believed that the functionalized graphene of the present disclosure can form various three-dimensional structures, such as shown in FIG. 8. FIG. 8 illustrates an assembly of functionalized graphene 810 and functionalized nanocarbons (FNC) 820 according to various embodiments. Functionalized graphene 810 may comprise a functional group that may be charged, such as exemplified positively charged group 815. In the exemplified embodiment illustrated in FIG. 8, the graphene is functionalized with polybenzimidazole (PBI). While PBI is exemplified, any suitable functional group could be used, such sulfonate, $SO_3H$, carboxylate, COOH, a tertiary amine, $NR_3^+$, where R is H, alkyl, aryl, or combinations thereof, polybenzimidazole (PBI), poly(ethylene oxide) (PEO), polyphenylene oxide (PPO), polyaniline, or mixtures thereof.

Functionalized nanocarbon 820 similarly may comprise a charged functionalized group, such as exemplary negatively charged group 825. The functional group of FNC 820 is not particularly limited and may comprise a metal oxide, a polymer coated metal oxide, or polymer grafted Si or $SiO_2$, or ceramic particles, or combinations thereof.

Figure 9:
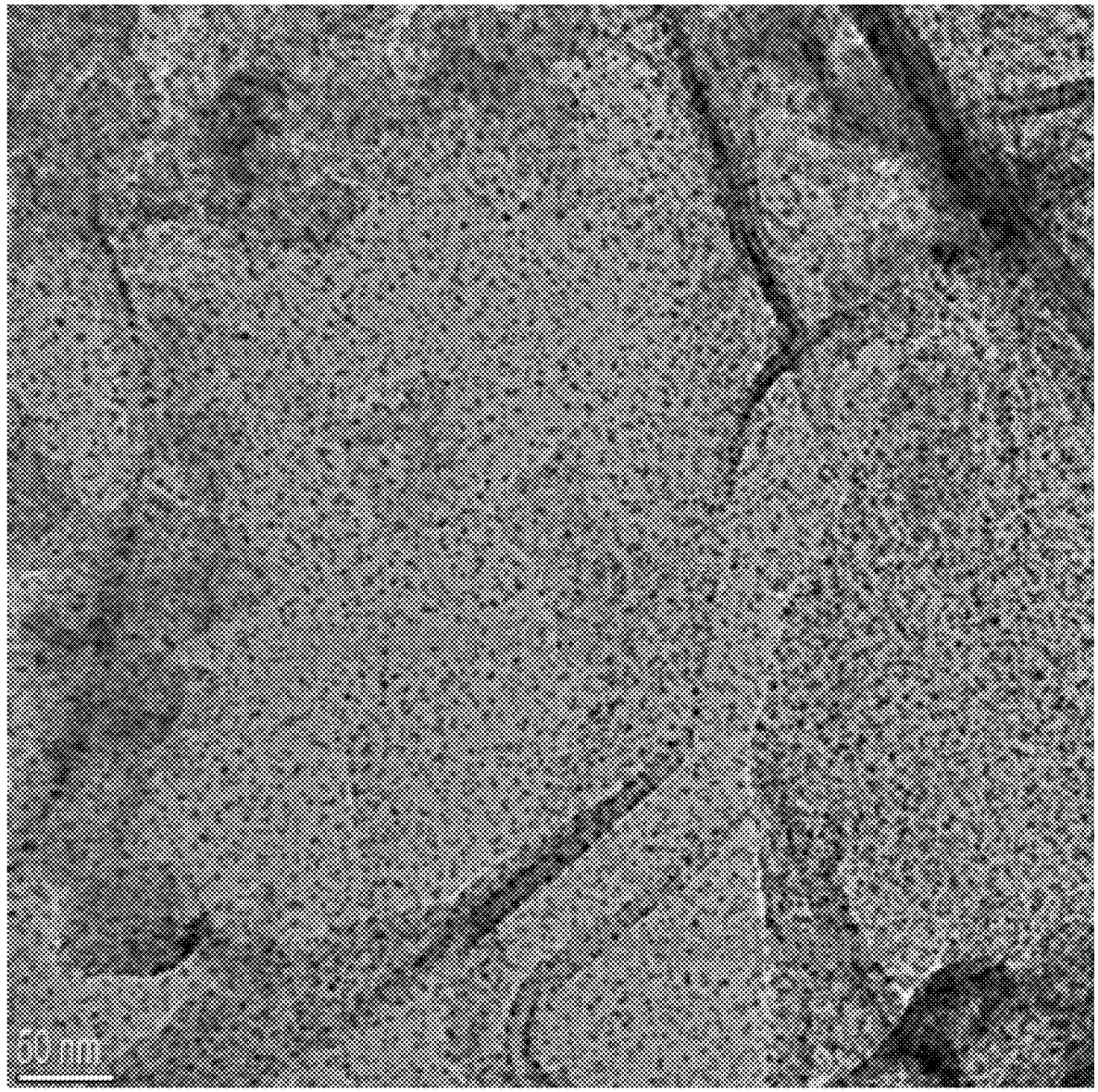
FIG. 9 illustrates a TEM image of composites according to various embodiments.

In various embodiments the addition of FNC 820 to the functionalized graphene 810 may cause FNC 820 and functionalized graphene 810 to self-assemble into three-dimensional structure 800. Thus, in various embodiments, the functionalized graphene may form a three-dimensional structure. Also, in various embodiments the three-dimensional structure may comprise a functionalized nanocarbon particle. FIG. 9 contains a TEM image of a three-dimensional structure comprising FNC and functionalized graphene according to various embodiments.

Figure 10:
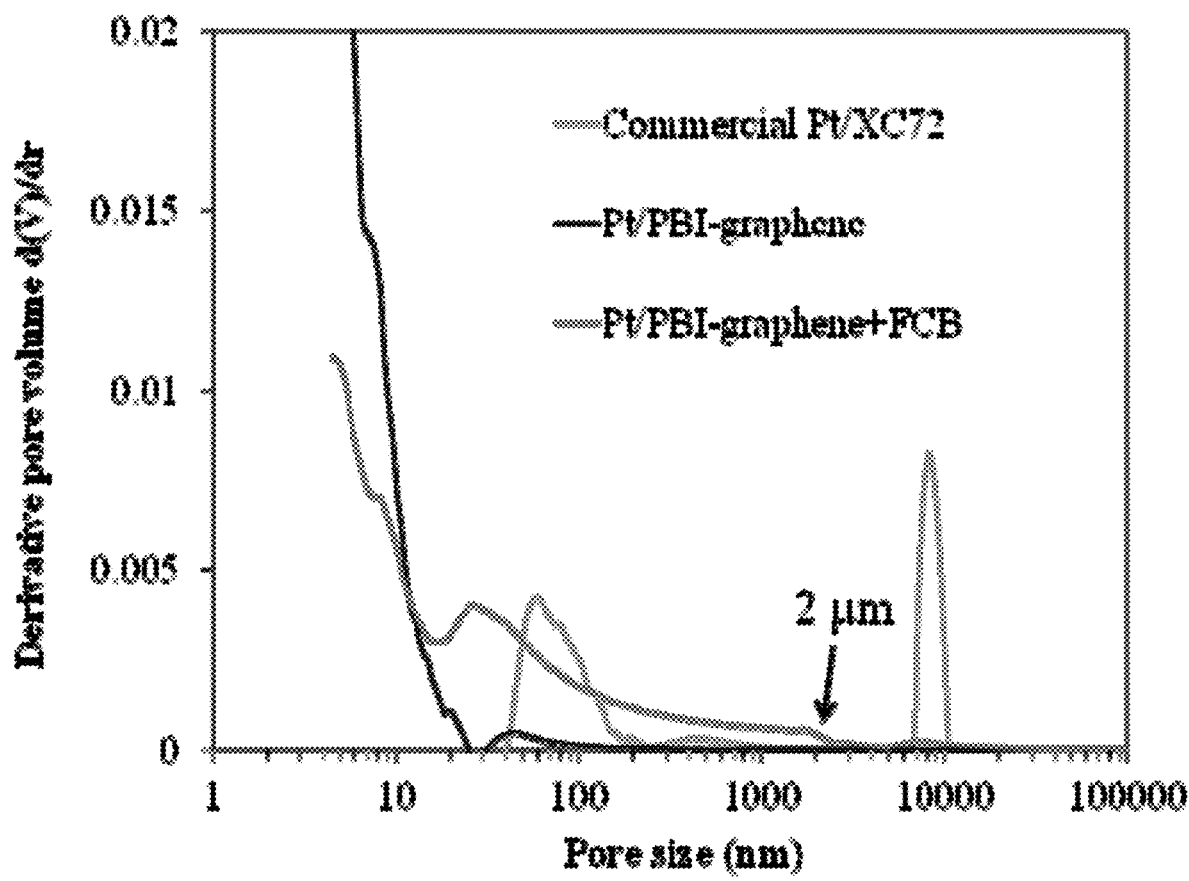
FIG. 10 illustrates Hg porosimetry pore size distribution of various embodiments.

With reference back to FIG. 8, the three-dimensional structure may comprise a second functionalized graphene 811, wherein the functionalized nanocarbon particle 820 is located between the functionalized graphene sheets and the second functionalized graphene. The placement of the FNC may cause the formation of pores or channels. In various embodiments, the pores or channels may have an average pore size between about 3 nm to about 2,000 nm, between about 25 nm and 1,000 nm, or between about 50 nm and about 750 nm. For example, FIG. 10 contains a comparison of the measurement of pore size as a derivative of pore volume with the pore size. As can be seen in FIG. 10, functionalized graphene with the addition of a functionalized nanocarbon particle had much large pore volume distribution than carbon black (XC72, commercially available from the Cabot Corporation) or functionalized graphene itself. Without being limited to any theory, it is believed that—in some embodiments—reducing the dimension of the graphene sheets can effectively or substantially improve the performance of graphene supported catalysts, for example, in fuel cells.

Figure 12A:
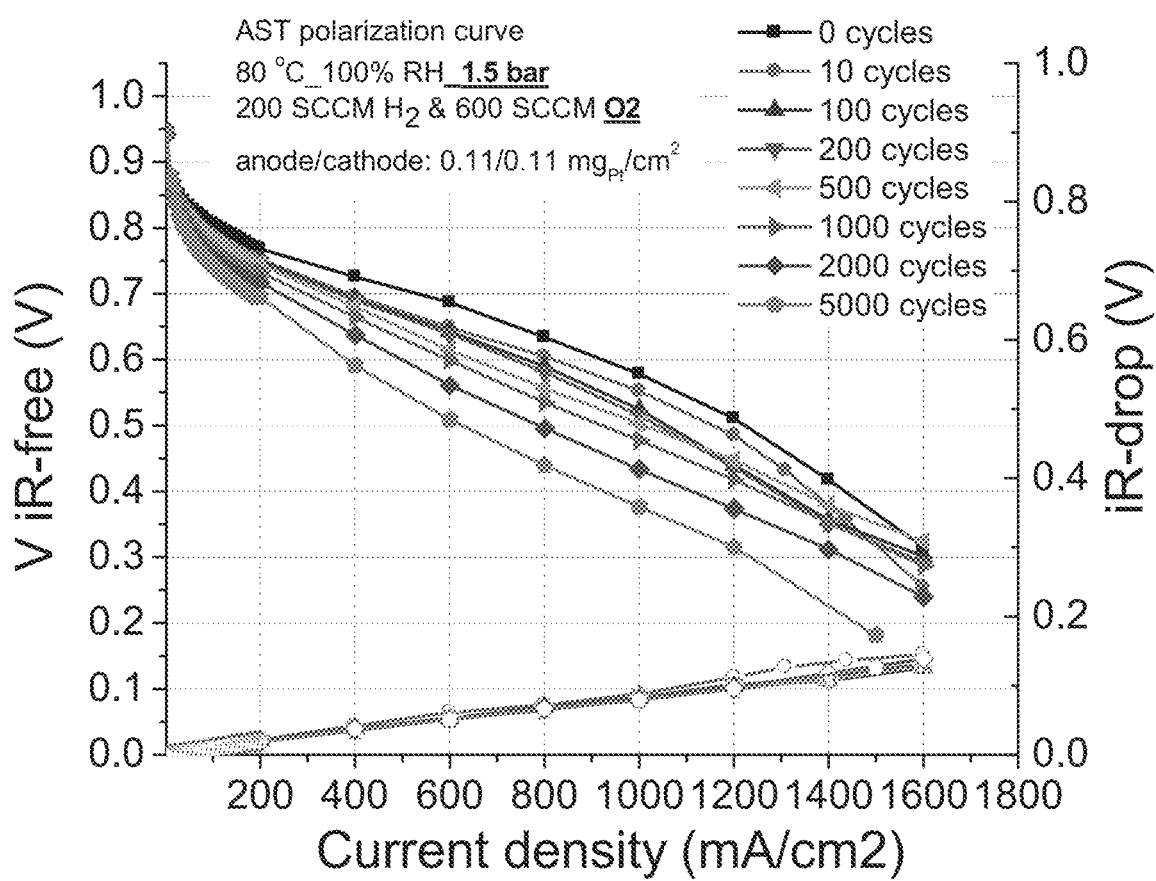
FIG. 12A-C illustrate various VIR curves after various cycles.
Figure 12B:
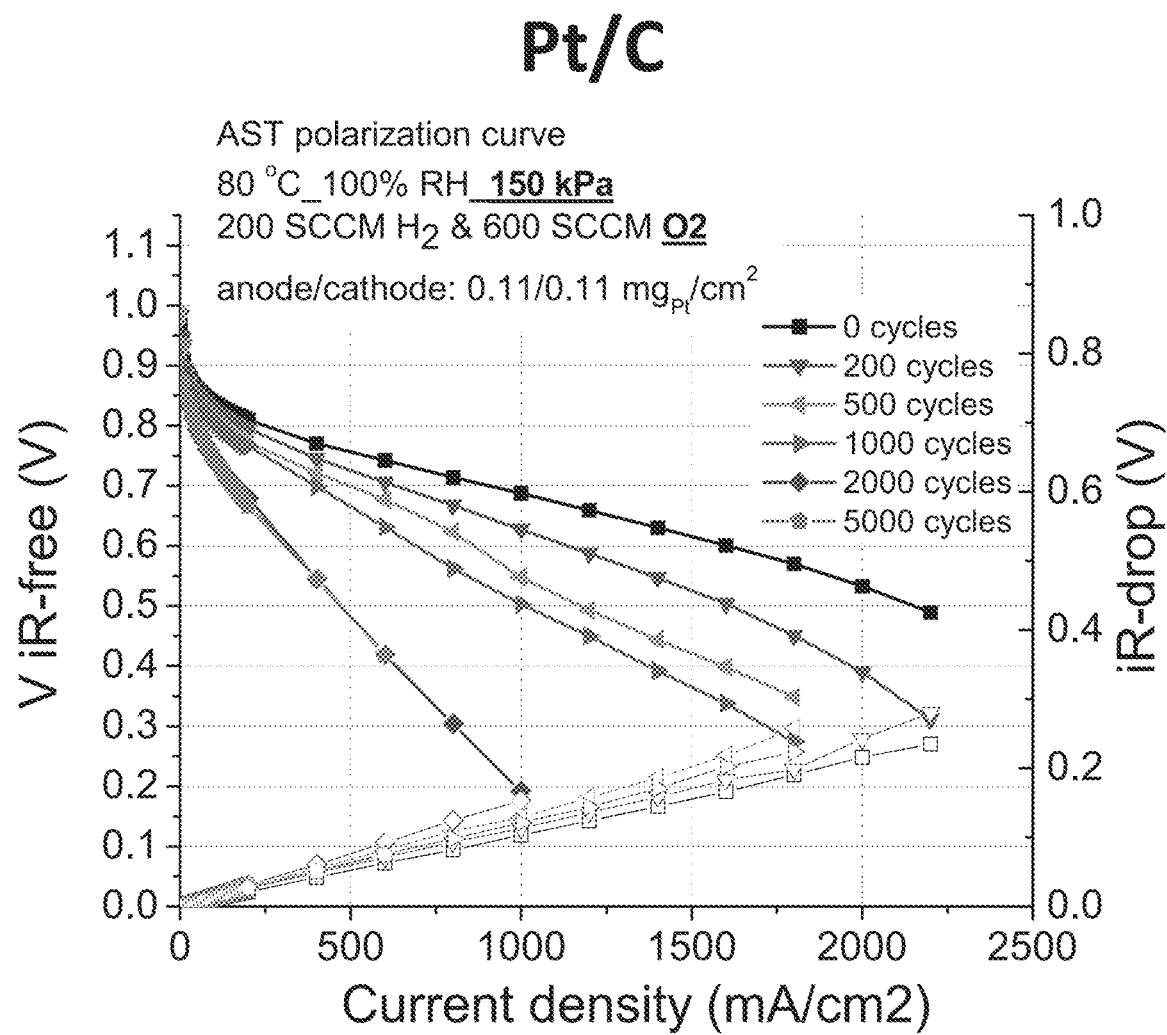
Figure 12C:
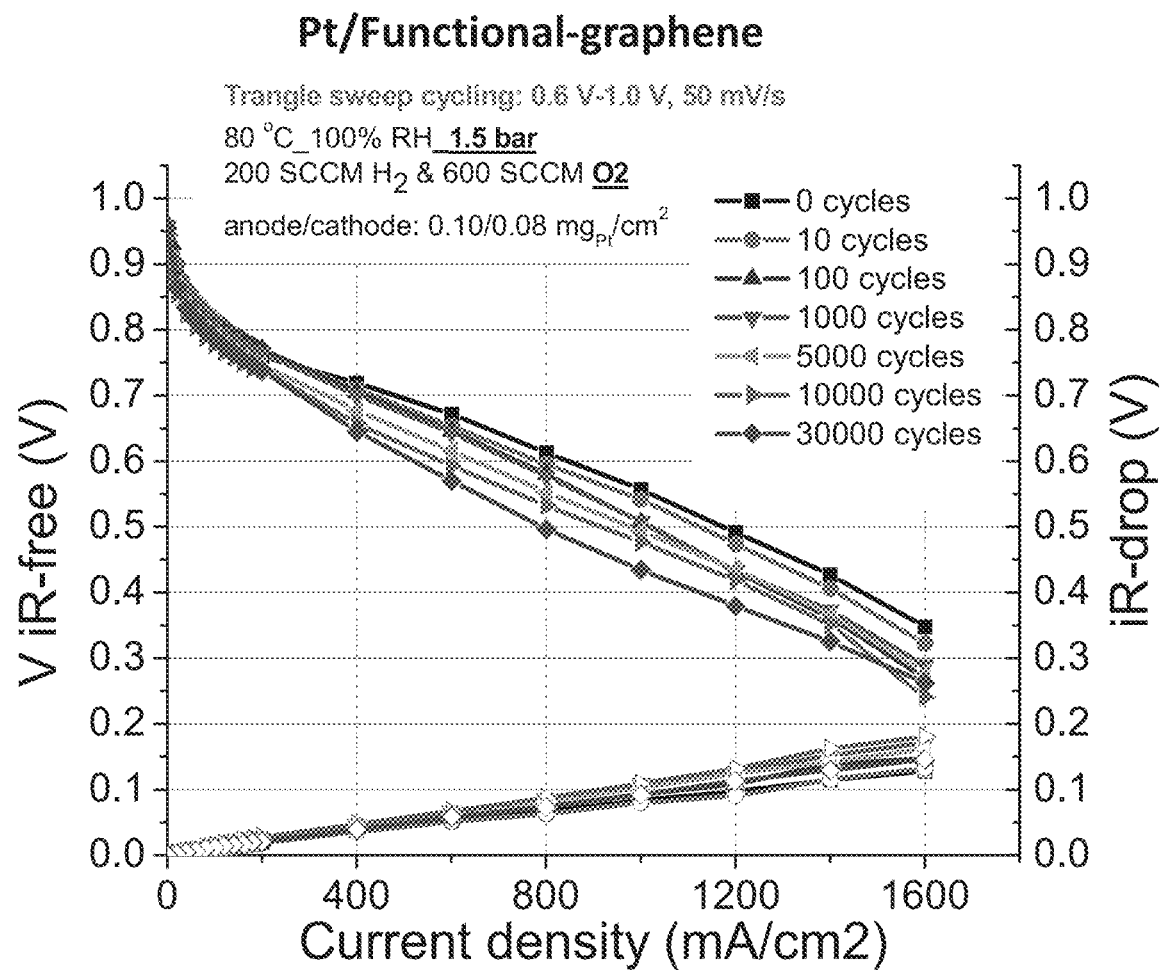
Figure 13:
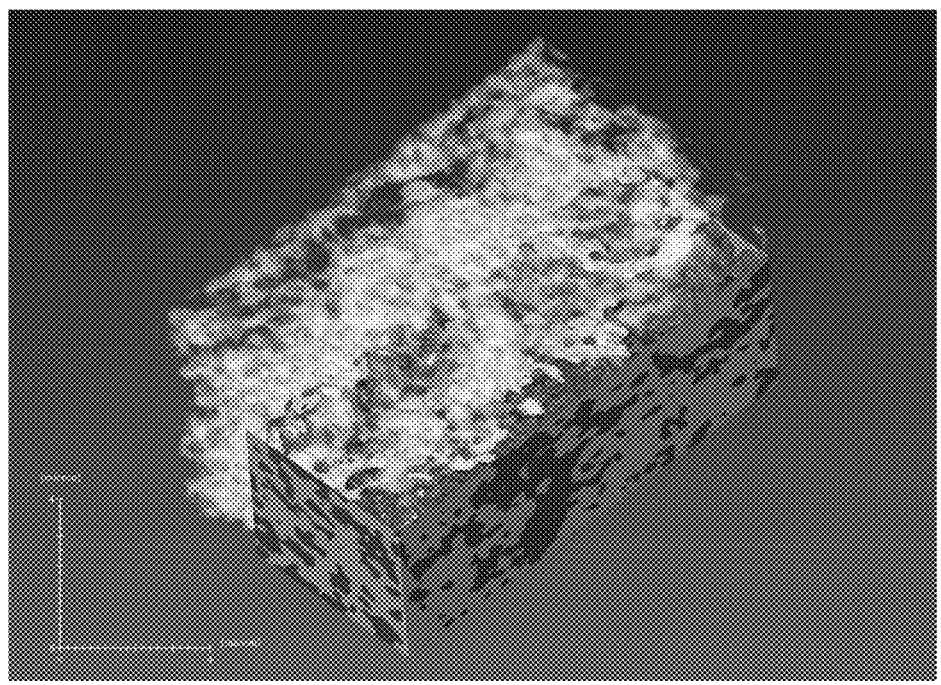
FIG. 13 illustrates a nanoscale x-ray computed tomography image of a Pt/PBI-functionalized graphene catalyst according to various embodiments.
Figure 14:
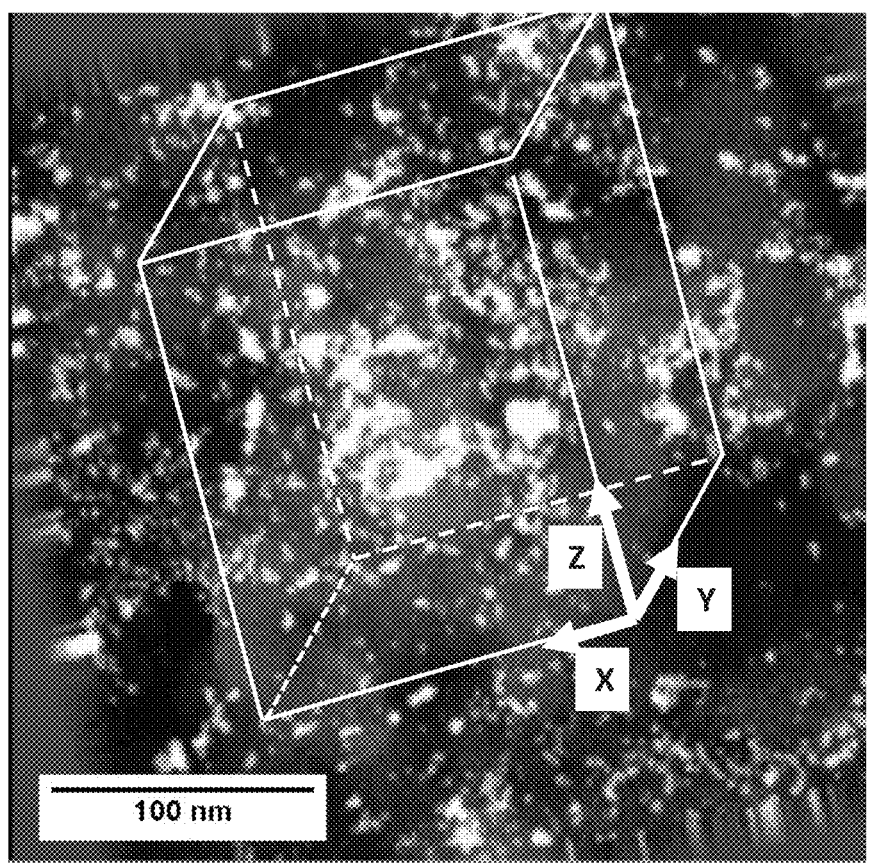
FIG. 14 illustrates a three-dimensional TEM image of a conventional Pt/XC72 (carbon black) catalyst.

FIG. 13 illustrates a nanoscale tomography image of a Pt/PBI-functionalized graphene catalyst layer in a membrane electrode assembly (MEA) measured by x-raynano-CT technique, according to various embodiments. As can be seen in FIG. 13, the functionalized graphene catalyst layer has a quite large pore volume and very uniform distribution of the pore structure, and these pores are connected to each other (they are open pores) which are represented by the clouds. These pore structures confirms that the claimed 3-D structure in FIG. 8 has been achieved which consequently lead to the superior fuel cell performance in FIGS. 11 and 12.

Figure 11A:
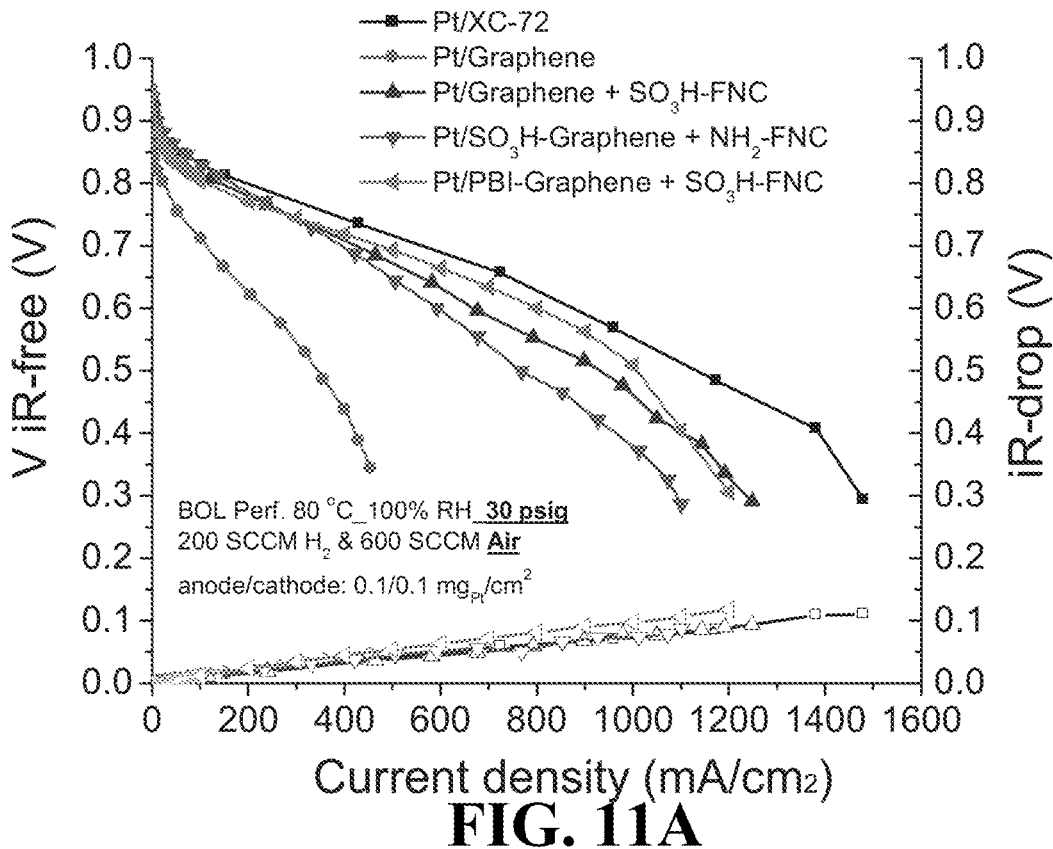
FIGS. 11A and 11B illustrate various polarizations curves.
Figure 11B:
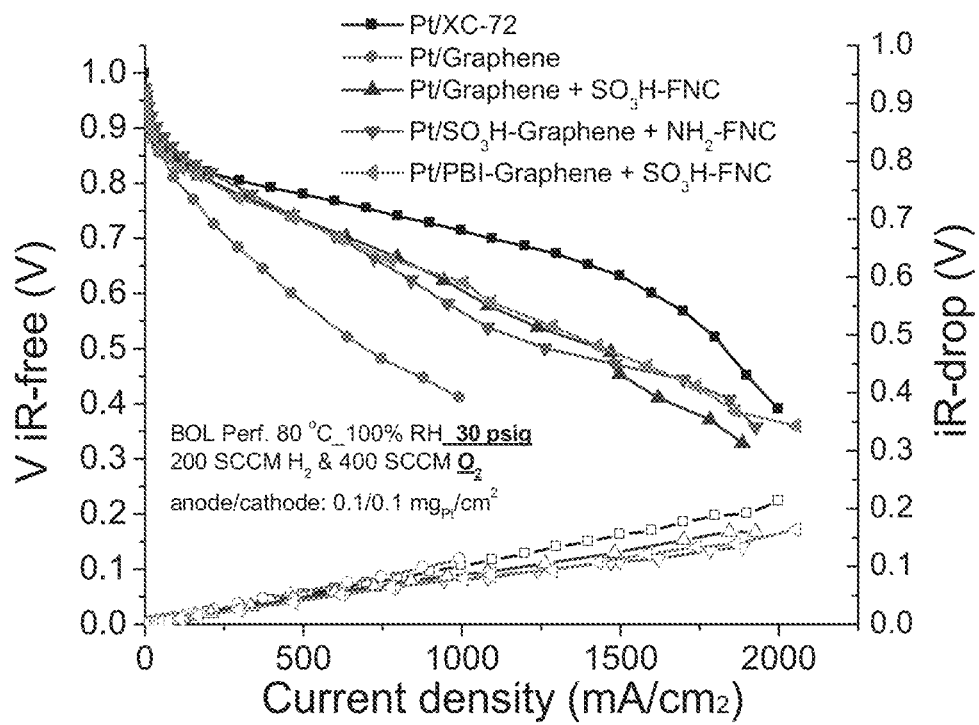

FIGS. 11A and 11B illustrate a comparison of membrane electrode assemblies (MEAs) comprising conventional materials (carbon black and graphene) and various membrane electrode assemblies comprising functionalized graphene according to various embodiments. As can be seen in FIGS. 11A and 11B, the functionalized graphene with FNC prepared following method 130 had unexpected improvements over conventional graphene at various current densities.

FIG. 12A-B illustrate various VIR curves after various accelerated stress test (AST) cycles. FIGS. 12A and 12B illustrates various VIR curves for different intervals for graphene functionalized with PBI and comprising a Pt metal according to various embodiments. FIG. 12B illustrates conventional carbon black (XC72) comprising Pt metal particles. As can be seen in FIGS. 12A and 12B, the functionalized graphene with FNC has much better stability AST cycling performance than the conventional carbon black illustrated in FIG. 12B. The functionalized graphene had a much less performance loss from mass activity, and had a higher performance after cycling. Also, the functionalized graphene with FNC showed improved Electrochemical Surface Area (ECSA) loss than conventional catalysts using carbon black and graphene. FIG. 12C illustrates the various VIR curves of functionalized graphene supported Pt particles at different accelerated stress test (AST) for Pt catalyst particles by potential cycling from 0.6V-1.0V for total 30K cycles. As can be seen in FIGS. 12A and 12C, catalysts with functionalized graphene may be much more stable than conventional catalysts having carbon black.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, or C may be present in a single embodiment; for example, A and B, A and C, B and C, or A and B and C. Different cross-hatching is used throughout the figures to denote different parts but not necessarily to denote the same or different materials.

Systems, methods and apparatuses are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A three-dimensional functionalized graphene structure comprising:
    a first functionalized graphene comprising:
        a first graphene sheet;
        a metal dispersed throughout the first graphene sheet, wherein the metal comprises at least one of Pt, Rh, Pd, Ag, Au, Ni, Os, Ir, Mn, Co, alloys thereof, oxides thereof, or mixtures thereof;
        a first functional group covalently bonded to the first graphene sheet, wherein the first functional group comprises at least one of sulfonate, $SO_3-$, Carboxylate, $COO-$, a tertiary amine, $NR_{3+}$, where R is H, alkyl, aryl, or combinations thereof, polybenzimidazole (PBI), poly(ethylene oxide) (PEO), polyphenylene oxide (PPO), polyaniline, or mixtures thereof;
    a second functionalized graphene; and
    a functionalized nanocarbon particle located between the first and second functionalized graphenes, wherein the functionalized nanocarbon particle has an opposite surface charge compared to the first functional group of the first functionalized graphene.

2. The three-dimensional functionalized graphene structure of claim 1, wherein:
    the first functionalized graphene has a positively charged first functional group; and
    the functionalized nanocarbon has a negatively charged functional group.

3. The three-dimensional functionalized graphene structure of claim 1, wherein the functionalized nanocarbon particle forms at least one of pores, channels, or a combination thereof between the first and second functionalized graphenes that allow mass transport of reactants and products between the first and second functionalized graphenes.

4. The three-dimensional functionalized graphene structure of claim 3, wherein the structure has an average pore size between about 3 nm to about 2,000 nm.

* * * * *